(12) United States Patent
Eira et al.

(10) Patent No.: US 10,511,402 B2
(45) Date of Patent: Dec. 17, 2019

(54) METHOD AND SYSTEM FOR ASSIGNING RESOURCES IN OPTICAL TRANSPORT NETWORKS

(71) Applicant: Xieon Networks S.à.r.l., Luxembourg (LU)

(72) Inventors: Antonio Eira, Amadora (PT); João Manuel Ferreira Pedro, Lisbon (PT)

(73) Assignee: Xieon Networks S.à.r.l., Luxembourg (LU)

(*) Notice: Subject to any disclaimer, the term of this patent is extended or adjusted under 35 U.S.C. 154(b) by 0 days.

(21) Appl. No.: 16/096,215

(22) PCT Filed: Nov. 21, 2017

(86) PCT No.: PCT/EP2017/079849
§ 371 (c)(1),
(2) Date: Oct. 24, 2018

(87) PCT Pub. No.: WO2018/121919
PCT Pub. Date: Jul. 5, 2018

(65) Prior Publication Data
US 2019/0313168 A1    Oct. 10, 2019

(30) Foreign Application Priority Data
Dec. 29, 2016 (EP) .................................. 16207354

(51) Int. Cl.
*H04J 14/02* (2006.01)
*H04Q 11/00* (2006.01)
*H04J 3/16* (2006.01)

(52) U.S. Cl.
CPC ........ *H04J 14/0257* (2013.01); *H04J 3/1652* (2013.01); *H04Q 11/0062* (2013.01); *H04Q 2011/0086* (2013.01)

(58) Field of Classification Search
CPC .......... H04J 14/0227–0276; H04J 3/1652–167
See application file for complete search history.

(56) References Cited

U.S. PATENT DOCUMENTS 6,538,777 B1 * 3/2003 Barry .................. H04J 14/0227
370/370
8,873,962 B2   10/2014 Patel et al.
(Continued)

FOREIGN PATENT DOCUMENTS

EP        2 571 184 A1   3/2013

OTHER PUBLICATIONS

Eira, A. et al., "On the Impact of Optimized Guard-Band Assignment for Superchannels in Flexible-Grid Optical Networks," OFC/NFOEC Technical Digest, OTu2A.5, 3 pages (2013).
(Continued)

*Primary Examiner* — Casey L Kretzer
(74) *Attorney, Agent, or Firm* — Nelson Mullins Riley & Scarborough LLP (57) ABSTRACT

The proposed invention is in the area of managing resources in optical transport networks, for example in the area of in-operation media channel format and spectrum management. For this purpose, the type of Media Channel Format is determined for each of a plurality of candidate paths, wherein each candidate path connects a pair of nodes in an optical transport network. Then, the expected weight describing traffic volume of each of the candidate paths is determined, and a spectrum share is assigned to each link of each of the candidate paths based on the determined Media Channel Formats and determined weights. In this way, spectrum shares assigned to different links and candidate paths can be used for efficiently assigning a band spectrum to each of the Media Channel Formats of the candidate paths.

15 Claims, 5 Drawing Sheets

(56) References Cited

U.S. PATENT DOCUMENTS

2015/0288478 A1  10/2015  Wellbrock et al.
2016/0112327 A1   4/2016  Morris et al.
2016/0241353 A1   8/2016  Wright et al.

OTHER PUBLICATIONS

International Search Report and Written Opinion, PCT/EP2017/079849, dated Feb. 20, 2018, 15 pages.
Klinkowski, M. et al., "Elastic Spectrum Allocation for Time-Varying Traffic in FlexGrid Optical Networks," IEEE Journal On Selected Areas In Communication, vol. 31(1):26-38 (2013).
Sugihara, S. et al., "Routing and Spectrum Allocation Method for Immediate Reservation and Advance Reservation Requests in Elastic Optical Networks," Photonics in Switching, Optical Networking (Topic 4), IEEE: 178-180 (2015).
Wang, X. et al., "Blocking Probability and Fairness in Two-Rate Elastic Optical Networks," IEEE, ICTON: TH.B3.2: 4 pages (2014).
Zhang, J. et al., "Dynamic Traffic Grooming in Sliceable Bandwidth-Variable Transponder-Enabled Elastic Optical Networks," Journal of Lightwave Technology, vol. 33(1) 183-191 (2015).

\* cited by examiner

METHOD AND SYSTEM FOR ASSIGNING RESOURCES IN OPTICAL TRANSPORT NETWORKS

RELATED APPLICATIONS

This application is a 35 U.S.C. 371 national stage filing of International Application No. PCT/EP2017/079849, filed on Nov. 21, 2017, which claims priority to European Patent Application No. 16207354.8, filed on Dec. 29, 2016. The entire contents of these applications are incorporated herein by reference in their entirety.

FIELD OF THE INVENTION

The proposed invention is in the area of managing resources in optical transport networks, including, for example, in-operation media channel format and spectrum management, and comprises a method for assigning resources in the optical transport network, and a system configured to perform the method.

BACKGROUND OF THE INVENTION

The availability of new modulation formats combined with the appearance of a flexible Dense Wavelength Division Multiplexing (DWDM) grid has led to new opportunities and challenges for improving the operation of optical transport networks.

More specifically, DWDM planning is a critical task for network deployments, and concerns the assignment of resources to traffic demands such that some criteria (e.g., total cost, spectrum consumption) is respected, improved or optimized. This task can be usually divided in two flavors: offline and online planning. The latter consists of assigning resources (routing path and spectral window) to new traffic requests as they arrive in the network. With only the knowledge of the current traffic demand and the already existing traffic, planning decisions are taken with a local scope, which can lead to scalability issues when the network grows. In view of this, attempts have been made, also in online applications, to plan ahead and provision the network infrastructure based on traffic forecasts built upon past history and future traffic expectations.

Figure 1:
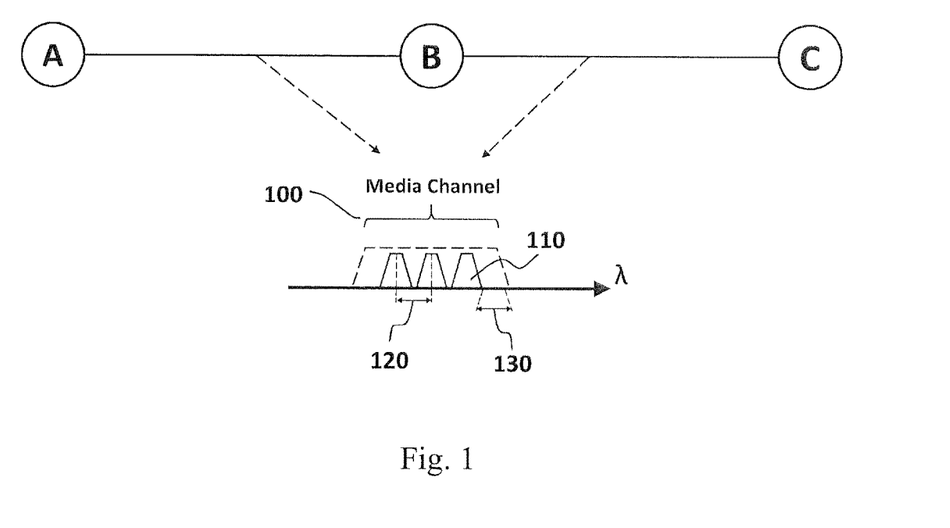
FIG. 1 is a schematic illustration of a Media Channel (MCh) through path A-B-C having three optical carriers separated by a carrier spectral spacing and including a guard-band.

In traditional fixed-grid networks, this planning process targets lowering the provisioning costs by balancing the load over the available network links, deciding where/when to light up new fibers and efficiently grooming client signals over the existing capacity. In this respect, the above mentioned availability of new modulation formats combined with a finer granularity flexible DWDM grid has greatly expanded the set of possible transmission formats which are available for transporting traffic. In particular, there now exists the concept of a Media Channel (MCh), where multiple optical carriers (which would previously be individual channels) between the same node-pair can be spectrally and logically aggregated into a single network entity and co-routed through the network. The optical path carrying the Media Channel (MCh) is defined by the set of links it uses to connect its end-nodes, and the format of the Media Channel (MCh) can be specified by, for example: the number and type of carriers it contains (i.e., which modulation format is used), the spectral spacing between those carriers and the guard-bands between the MCh edge and the carrier closest to that edge. A corresponding MCh 100 through path, defined by the network nodes A-B-C, and having three optical carriers 110 separated by carrier spectral spacing 120 and including guard-bands 130 is shown in FIG. 1.

In other words, the availability of new modulation formats combined with the appearance of a flexible Dense Wavelength Division Multiplexing (DWDM) grid has led to the emergence of the Media Channel (MCh) concept, wherein multiple individual carriers between the same end-nodes are logically aggregated, for example in a single layer-0 container, and can be viewed by a respective control plane as a unique entity. A significant advantage of the MCh scheme is that Media Channels (MChs) enable a more efficient spectrum utilization as the multiple carriers inside a MCh effectively share the same guard-band; see further discussion in "On the impact of optimized guard-band assignment for superchannels in flexible-grid optical networks" by A. Eira, J. Pedro, J. Pires, in Proc. Optical Fiber Communication Conference (OFC), paper OTu2A.5, March 2013. In this respect, in order to ensure that optical performance thresholds are not violated, each MCh includes on both its edges a guard-band of unused spectrum to reduce interference from adjacent MChs. It follows that it is spectrally efficient to have as few MCh containers per node-pair as possible, in order to reduce the amount of spectrum that must be provisioned for guard-bands.

Figure 2:
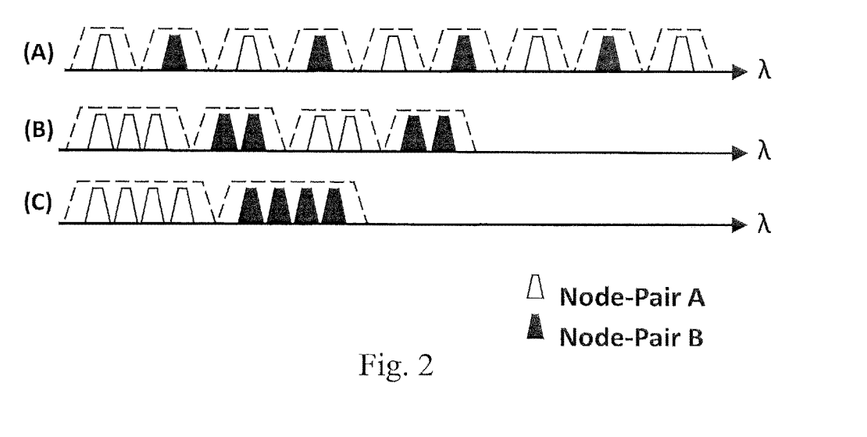
FIG. 2 is a graphical presentation of a spectrum on a given network link: when using single-carrier channels (A), when using MChs without optimizing the number of guard-bands (B), and wherein the spectrum has been optimized to use the least spectrum resources possible (C)

Seizing the spectral benefits of a flexible-grid and MChs requires a planning method that is aware of the importance of efficient guard-band utilization, for example by minimizing the amount of spectral containers between node-pairs. In an offline planning application where all traffic is known, optimization methods can be designed to plan all demands by simultaneously minimizing the set of required MCh containers. By contrast, in online applications, the network management system/Software-defined Networking (SDN) controller only has information about the current service to provision and the existing network state (deployed MChs). Hence, without any other knowledge or prediction capability, service provisioning must use whatever MCh capacity is available or else create new containers. In the long-run, operating the network in this fashion may create inefficiencies in the use of available spectrum by unnecessarily creating multiple MChs between the same node-pairs and thus wasting the spectrum used for guard-bands in each of them. FIG. 2 shows an example of how the spectrum on a given network link may look like when using single-carrier channels (A), when using MChs without optimizing the number of guard-bands (B), and how the spectrum should ideally look like in order to use the least spectrum resources possible (C). This introduces in the planning process a new degree of "optical grooming", where it is desirable to direct new optical carriers towards existing MCh containers in order to improve the overall spectrum utilization; see further discussion in "Dynamic traffic grooming in sliceable bandwidth-variable transponder-enabled elastic optical networks" by Zhang, Y. Ji, M. Song, Y. Zhao, X. Yu, J. Zhang, B. Mukherjee, Journal of Lightwave Technology, vol. 33, no. 1, pp. 183-191, January 2015. Thus, network planning methods including routing and spectrum assignment must account for the reach/capacity trade-off inherent to the availability of multiple modulation formats, as well as the spectral dividend yielded by reducing the number of logical channels between end-nodes.

Conventionally, routing and spectrum assignment engines are embedded in network management systems/Software-defined Networking (SDN) controllers for online operation, and employ a simple resource management strategy by: simply checking for existing capacity at the Media Channel (MCh) layer, and deploying new carriers in existing Media Channels (MChs) if possible, or otherwise creating new Media Channel (MCh) containers; wasting the spectrum required for provisioning new guard-bands. Moreover, the creation of these containers is usually associated to a specific transponder card or follows a fixed rule (i.e., always the same size of container), which further adds to the spectral inefficiency of these methods.

It follows that conventional online planning methods exploiting MChs do not envision a global spectrum reservation policy to reduce the inefficiencies generated by guard-bands. In some cases, spectrum is reserved for the transponder module itself, based on the number of subcarriers it supports; see "Dynamic traffic grooming in sliceable bandwidth-variable transponder-enabled elastic optical networks" by Zhang, Y. Ji, M. Song, Y. Zhao, X. Yu, J. Zhang, B. Mukherjee, Journal of Lightwave Technology, vol. 33, no. 1, pp. 183-191, January 2015. This assumes that a MCh is directly associated to a specific transponder module/card, and thus limits the flexibility of the MCh itself. Furthermore, it does not incorporate any forecast/historical data and so it is unable to properly coordinate the distribution of the available spectral resources among the various MChs.

In "Blocking probability and fairness in two-rate elastic optical networks" by X. Wang, J. Kim, S. Yan, M. Razo, M. Tacca, A. Fumagalli, in *Proc. International Conference on Transparent Optical Networks (ICTON)*, paper Th.B3.2, July 2014, a method is proposed to partition the spectrum among various channels' rates (modulation formats) in order to reduce the blocking probability in dynamic scenarios. This approach pertains only to the division among different channel widths to reduce fragmentation, but does not consider the distribution of spectrum within each rate to each particular node-pair, and hence cannot have a global optimized view of how to maximize throughput in the network. The solution in "Routing and spectrum allocation method for immediate reservation and advance reservation requests in elastic optical networks" by S. Sugihara, Y. Hirota, S. Fujii, H. Tode, T. Watanabe, in *Proc. Photonics in Switching (PS)*, pp. 178-180, September 2015, proposes a "soft-reservation" scheme where spectrum is reserved in bands for immediate and advanced reservation, but separating the bands means that the benefit of optical grooming is not duly exploited. Nor does the proposal consider the relative weight of the overall traffic distribution, or network-wide contention for the links used in each path to distribute the spectrum among each node-pair.

SUMMARY OF THE INVENTION

Accordingly, a problem underlying the present invention is to provide an improved method and system to further exploit the benefits of using the MCh concept in optical transport networks.

This problem is solved by a method for assigning resources in an optical transport network as defined in claim 1, and by a system as defined in claim 15 configured to perform the method.

The method for assigning resources in an optical transport network, comprises determining a plurality of candidate paths each connecting a pair of nodes in an optical transport network. In other words, for a given network topology of an optical transport network, candidate paths, including at least one optical link between nodes of the optical transport network, are queried to determine available paths for connecting node-pairs in the optical transport network. For example, FIG. 1 shows the pair of nodes A and C coupled via the intermediate node B by two optical links A-B and B-C forming the candidate path A-B-C. Further, the optical link A-B forms a candidate path coupling the pair of nodes A and B, and the optical link B-C forms a candidate path coupling the pair of nodes B and C. Accordingly, a more complex optical transport network may include additional nodes allowing the determination of a plurality of candidate paths coupling the same pair of nodes; see further examples discussed below.

For each of the determined candidate paths, the type of Media Channel Format to be used by the candidate path for connecting the respective pair of nodes is determined. In this respect, the MCh format is determined by defining at least one of: the modulation format of the carriers, the intra-carrier spacing and the guard-band, used by a MCh coupling the pair of nodes associated with the candidate path. Hence, in order to improve or minimize the number of MChs per node-pair, the number of carriers in the MCh is not pre-defined, and the MCh format can be determined based on the modulation type, intra-carrier spacing and/or guard-band. Accordingly, the base spectral-efficiency of the MCh can be improved as the number of carriers assigned to the MCh increases.

Further, for each of the determined candidate paths, the expected weight of the candidate path is determined, wherein the determined weights provide a relative estimate of traffic volume via the candidate paths. In this way, the weight of traffic traversing the candidate paths can be compared by using the determined weights. For example, traffic history and prediction database can be queried over the expected weight of a given node-pair in the overall traffic volume. Here, a definition of a particular target data-rate for a given node-pair is not required, but rather that the determined weights allow a relative estimate of the node-pair's traffic volume in comparison to others. For example, the determined weight of a first candidate path may be 2,5 whereas the determined weight of a second candidate path may be 5,0 indicating that the second candidate path is expected to carry twice the traffic volume of the first candidate path. Hence, two or more candidate paths traversing the same optical link can contend based on their relative weights for spectral capacity on the optical link, without requiring the weights to fix any absolute traffic volumes representing target data-rates for the respective candidate paths.

Accordingly, based on the above determined Media Channel Formats to be used for the candidate paths and based on a comparison of the determined expected weights of the candidate paths contending for spectral capacity on each optical link of the candidate paths, a spectrum share is assigned to each link of each of the candidate paths. In other words, having determined the relative weights for each (node-pair+MCh format+candidate-path) combination, it is possible to combine the requirements for each respective node-pair in the network links where multiple candidate paths contend for spectral capacity. This step adjusts the spectrum share assignment in each link, for example to maximize global throughput whilst ensuring a fairness criteria is enforced, wherein all node-pairs have spectrum assigned to them in proportion to their relative traffic forecast weight.

Then, a band spectrum is assigned to the Media Channel Format to be used by each of the candidate paths corresponding to the spectrum shares assigned to the optical links of the candidate paths. In other words, the above spectrum share assigned to each link of each of the candidate paths is used to determine and assign corresponding band spectrums to the Media Channel Formats used by the candidate paths traversing the respective link. For example, a particular optical link can be traversed by a plurality of candidate paths coupling the same or different nodes of the optical transport network. In order to assign an appropriate band spectrum to the Media Channel Format of each of the candidate paths passing through the optical link, the spectrum shares of the different candidate paths passing through the optical link are compared and used for performing the assignment, for example such that the different candidate paths have spectrum assigned to them in proportion to their relative traffic. Hence, the spectrum shares calculated for each link are used for producing a feasible routing and spectrum band assignment (or band assignment) solution that comply with the given spectrum shares. However, it should be noted that it may be difficult or impossible to attain the exact share targets by the spectrum assignment because of practical reasons, for example because the band spectrum assigned to a candidate path must be the same in all links it traverses and because the spectrum must be allocated in multiples of a given size complying with technical implementations used in the optical transport network. In this case, the spectrum assignment still considers the above determined spectral shares of candidate paths, but may be required to deviate from the exact values, for example by less than 1%, 5% or to, or by a value representing a minimized deviation from the exact values which may be provided by an optimization algorithm.

In order to perform the most complete global assignment of band spectrums to the Media Channel Formats used by each of the candidate paths, it may be desirable that the determined candidate paths include all available candidate paths connecting all pair of nodes in the optical transport network, in particular all combinations of end-nodes configured to add and/or drop data. This allows to simultaneously analyze all, or at least all significant, node-pairs and verify the link contention between them derived from the network topology. Afterwards, this information can be associated with traffic forecasts and/or measured traffic history (if available), to produce a tentative network-wide MCh reservation for each node-pair that improves or maximizes overall throughput. This can be accomplished, for example, by minimizing the amount of MChs deployed per node-pair and thus the amount of spectrum wasted on guard-bands. Accordingly, this method can automatically select for each optical path the most suitable transmission format (modulation format, baud rate, etc.) to be used for the carriers in each MCh container.

As mentioned above, determining the type of Media Channel Format to be used for each of the candidate paths may include determining the modulation format of carriers, the intra-carrier spacing between carriers, and/or the guard-band used in the respective Media Channel Format. In this example, the base spectral-efficiency of the MCh can be improved as the number of carriers assigned to the MCh increases.

For this purpose, determining the type of Media Channel Format to be used for each of the candidate paths can, for example, include comparing the spectral-efficiency of different Media Channel Format types, preferably by considering: the physical distance between nodes connected by the path candidates, the type or types of fiber used for connecting the nodes, the number of nodes traversed by the path candidates, the signal strength of transmitter light, the corresponding signal-to-noise ratio at the receiver, and the number of and/or properties of amplifiers arranged along each candidate path.

As mentioned above, determining the expected weight of each of the candidate paths may include predicting the traffic volume via the candidate paths, preferably by querying a traffic history database and/or a scheduled traffic demand database. Hence, the measured traffic volume of the respective candidate paths may be monitored and stored in a database such as to allow using this information for predicting the traffic volume via the candidate paths. For this purpose, predictions may be based on any conventional prediction method or prediction model, for example by including trend analysis to estimate future traffic demand, and/or by using scheduled traffic demand profiles to execute prediction models.

The above spectrum share assigned to each optical link of each of the candidate paths can, for example, be proportional to the predicted relative weight of the candidate paths when compared to all weights carried by the respective optical link. In this way, by considering the spectrum shares assigned to each optical link of each of the candidate paths, it is possible to improve or optimize the global throughput of the network and/or to enforce a fairness criteria defining the desired traffic distribution in the optical transport network.

In any of the above described methods according to the present invention, assigning a band spectrum to the Media Channel Format to be used by each optical link of a candidate path can include providing for a spectrum continuity of the Media Channel Format used by the candidate path. Hence, the respective spectrum band assignment can, for example, be performed to respect spectrum continuity constraints, wherein for the same MCh, the same spectral window must be reserved on all links. Accordingly, the band spectrum can be assigned to all optical links of a candidate path such as to correspond to the minimum spectrum share of the optical links of the candidate path.

Assigning a band spectrum to the Media Channel Format to be used by each optical link of a candidate path can be based on assigning a single Media Channel Format allocated to a single spectral window to each candidate path. In this example, different Media Channel Formats or different spectral windows may be assigned to different candidate paths. For this purpose, the single spectral window of a candidate path can, for example, occupy at least 10%, 20%, or 30% of the total traffic volume carried by each optical link of the candidate path. This is particularly advantageous, because when the connection provided by the candidate path complies with a relatively large bandwidth requirement, relatively wide MChs can be deployed to explore the spectral dividend of improving the efficiency of or optimizing guard-bands over deploying multiple smaller MChs; see above discussion on spectral efficiency.

Preferably, any of the above described methods according to the present invention can be repeated when a node is added to or removed from the optical transport network. In this way, a structural change in the optical transport network is accounted for by adjusting the assignment of resources. Similarly, live traffic information or received forecasts describing expected changes in demands can be monitored and used for updating a predicted traffic volume via the candidate paths of the optical transport network. For example, if monitored traffic information is not consistent with expected predicted values, the assignment of resources can be adjusted by repeating the assignment of resources.

In this regard, the monitored traffic information can be used for updating the predicted traffic volume such as to adjust the expected weight of each of the candidate paths. For example, the steps of: determining the type of Media Channel Format to be used for each of the candidate paths; determining the expected weight of each of the candidate paths; assigning a spectrum share to each link of each of the candidate paths; and assigning a band spectrum to the Media Channel Formats to be used by each of the candidate paths, can be repeated when the predicted traffic volume is updated, such as to improve the assignment of the resources in the optical transport network.

As explained above, live traffic information or received forecasts describing expected changes in demands can be monitored and used for updating a predicted traffic volume of the candidate paths. In this respect, the receiving forecasts can, for example, describe expected changes in demands, for example by providing information indicating that a change in traffic demand or technical installation in one of the nodes of the optical transport network is expected to affect the traffic volume in the optical transport network. For example, a change in traffic demand may represent a new service affecting network traffic being implemented, or a running service being cancelled; and the change in technical installation may represent the installation, replacement or removal of technical equipment or devices at a network node, and may also describe the unavailability of a technical equipment or device at a network node due to maintenance work.

As mentioned above, the problem underlying the present invention can also be solved by providing a system including a processor and a memory, wherein the memory is coupled to the processor and stores instructions adapted to have the processor perform any of the above methods according to the present invention.

DESCRIPTION OF THE PREFERRED EMBODIMENTS

For the purposes of promoting an understanding of the principles of the invention, reference will now be made to the preferred embodiments illustrated in the drawings and specific language will be used to describe the same. It will nevertheless be understood that no limitation of the scope of the invention is thereby intended, such alterations and further modifications in the illustrated devices and method and such further applications of the principles of the invention as illustrated therein being contemplated therein as would normally occur now or in the future to one skilled in the art to which the invention relates.

Figure 3:
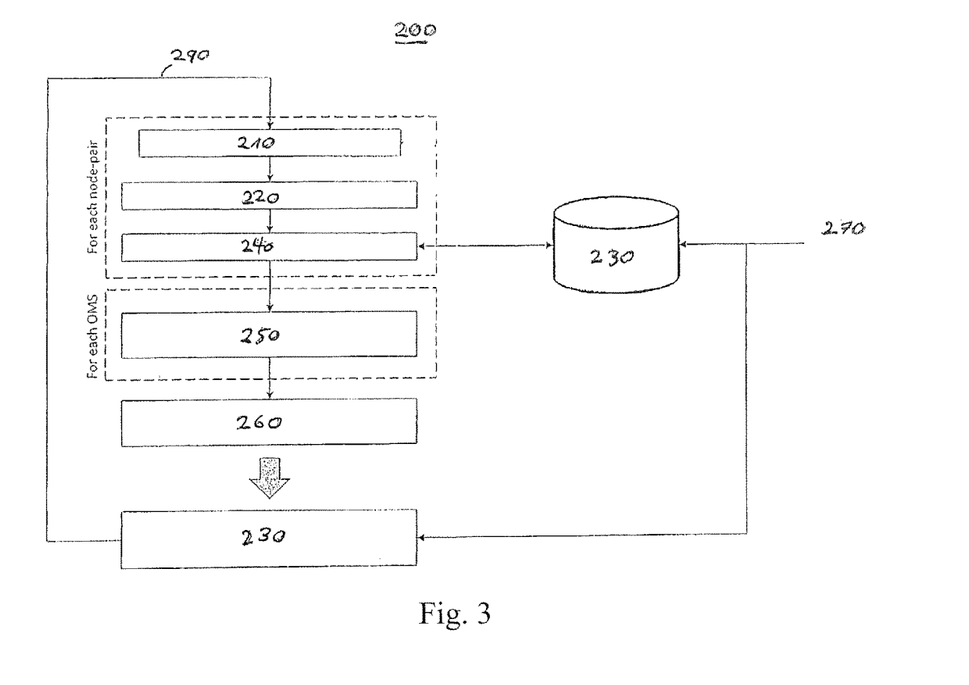
FIG. 3 is a block diagram illustrating a method for assigning resources in an optical transport network according to the present invention.

FIG. 3 shows an example of the method 200 for assigning resources in an optical transport network according to the present invention. In this example, for a given network topology, candidate paths are queried 210, for example, over the complete set of available paths for each node-pair of the optical transport network. Hence, the method comprises determining a plurality of candidate paths 210 each connecting a pair of nodes in an optical transport network. Then, for each of the determined candidate paths, the type of Media Channel Format to be used by the candidate path for connecting the respective pair of nodes is determined 220. In this example, the MCh format is determined by defining at least one of the modulation formats of the carriers, the intra-carrier spacing and the guard-band, used by a MCh coupling the pair of nodes associated with the candidate path. It follows that as the number of carriers in the MCh is not pre-defined, the method can be applied to minimize the number of MChs per node-pair. In other words, as the type of MCh format is based solely on the modulation type, intra-carrier spacing and guard-band, the base spectral-efficiency of each MCh type is already defined, and can only be improved as the number of carriers assigned to the MCh increases.

After the candidate paths and respective preferred MCh types have been determined, a traffic history and prediction database 230 is queried over the expected weight of a given node-pair in the overall traffic volume. In this way, for each of the determined candidate paths, the expected weight of the candidate path is determined 240, wherein the determined weights provide a relative estimate of traffic volume via the candidate paths. It should be noted that this step of the method does not require the definition of a particular target data-rate for a given node-pair, but rather a relative estimate of the node-pair's traffic volume in comparison to others. Hence, the determined weight of traffic traversing the candidate paths can be used for performing a relative comparison of traffic volume expected to be carried by the different candidate paths, as discussed in detail above.

Having determined relative weights for each node-pair+MCh-type+path-combination, the node-pairs in each of the network optical links are considered in combination where multiple pairs contend for spectral capacity. In other words, based on the above determined Media Channel Formats to be used for the candidate paths, and also based on a comparison of the determined expected weights of the candidate paths contending for spectral capacity on each optical link of the candidate paths, a spectrum share is assigned to each link of each of the candidate paths 250. Hence, in this example, the spectrum share assignment in each link is adjusted, for example to maximize global throughput whilst ensuring a fairness criteria is enforced; see discussion above. In this example, all node-pairs have spectrum assigned to them in proportion to their relative traffic forecast weight.

The final method step 260 shown in FIG. 3 involves taking the spectrum shares calculated for each link and producing a feasible routing and spectrum assignment (or band assignment) solution that complies with the given shares. Hence, band spectrum is assigned to the Media Channel Format 260 to be used by each of the candidate paths and corresponding to the spectrum shares assigned to the optical links of the candidate paths. In this example, an end-of-life solution respecting spectrum continuity constraints (for the same MCh, the same spectral window must be reserved on all links) is determined, such that the deviation from the spectrum shares previously calculated is minimal.

Moreover, the determination of the spectrum band assignment solution can be repeated, if required, for example to account for new network traffic. It follows that new or adjusted demands added to or adapted in the network will comply with the pre-defined MCh format, routing path and spectrum band selected for each node-pair. For this purpose, while in operation, the traffic-history/forecast-database 230 can be continuously updated with live traffic information, or externally provided with updated forecasts 270 (e.g., if an on-off event is expected to significantly alter the node-pair shares). When the data is found to significantly deviate from the forecast upon which the spectrum assignment was based, a network controller 280 may trigger 290 the planning workflow in order to readjust the spectrum shares accordingly.

An implementation example of this workflow is now provided. Let us assume the topology of an optical transport network 300 shown in FIG. 4, along with the traffic expectations between node pairs indicated by weight factors, the type of MCh format used, the corresponding base spectral efficiency (SE) factor corresponding to the respective the type of MCh format, and the relative weight accounting for the base spectral efficiency (SE), as shown in Table I.

TABLE I

Node-Pair Weights

| Node-Pair | Weight Factor | MCh Type | SE Factor | Relative Weight |
|---|---|---|---|---|
| A-E | 8 | X | 1.0 | 8.0 |
| B-F | 6 | Y | 0.5 | 12.0 |
| A-C | 12 | Z | 2.0 | 6.0 |
| B-C | 8 | Z | 2.0 | 4.0 |
| D-E | 10 | Z | 2.0 | 5.0 |
| D-F | 14 | Z | 2.0 | 7.0 |

}48 +0 Node-Pair Weights?

Figure 4:
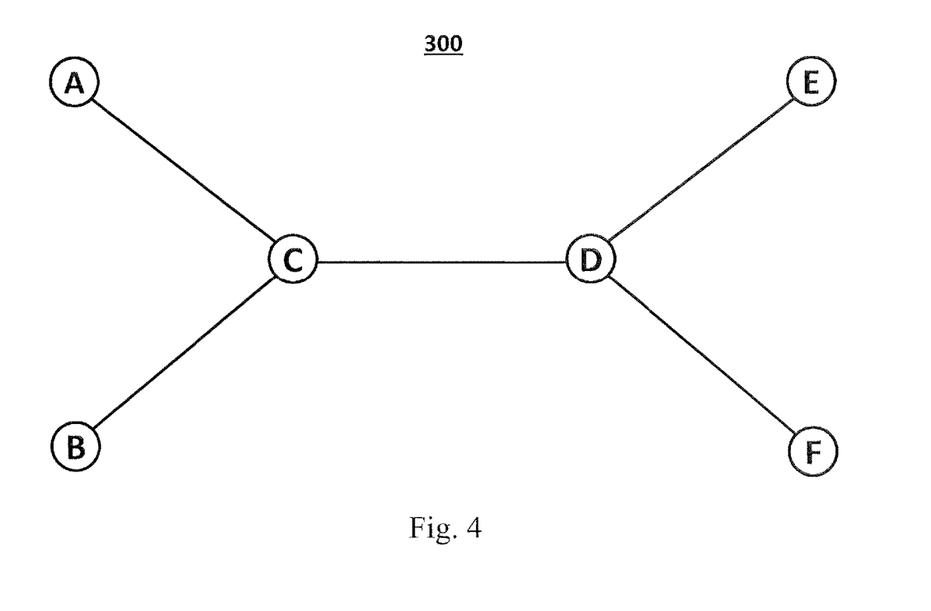
FIG. 4 is a schematic illustration of an example of a topology of an optical transport network.

For simplicity, in this example only one path is available between each node-pair, such that there is a unique type of MCh format that is optimal for each node-pair (in general the node-pair connectivity may be distributed over multiple paths). Based on this type of MCh format, a base spectral efficiency (SE) factor is assigned to each node-pair. This factor will scale the weight factor of each node-pair, which is based on the traffic volume expectation provided by the forecast database or measured from the live traffic history 230. For example, path B-C-D-F, being longer, may require a more conservative modulation format, decreasing its base spectral efficiency (SE) factor. As a result, the relative weight of node-pair B-F must increase in the inverse proportion, as it requires twice as much spectrum to carry the same volume of traffic.

Based on this information, the MChs going through each link and their respective relative weights are determined. Table II shows the results, which determines the percentage of each link's spectrum that can be allocated to each MCh. The spectrum shares in Table II reflect the assignment that should be made if each node-pair used only a single link.

TABLE II

Relative shares per link

| Link | Demands | Shares |
|---|---|---|
| A-C | A-E (8) | 57% |
|  | A-C (6) | 43% |
| B-C | B-F (12) | 75% |
|  | B-C (4) | 25% |
| C-D | A-E (8) | 40% |
|  | B-F (12) | 60% |
| D-E | A-E (8) | 62% |
|  | D-E (5) | 38% |
| D-F | B-F (12) | 63% |
|  | D-F (7) | 37% |

In order to respect the spectrum continuity constraint discussed above, the minimum share assignment for each node-pair is given by the lowest share value over all the links traversed by the MCh between that node-pair, as shown in Table III. The assignment of shares per MCh allows determining a spectrum assignment to each MCh that follows the spectrum shares defined in Table III (or deviates from it as little as possible).

TABLE III

Spectrum shares per node-pair

| Node-Pair | Shares per Link | Min. Share |
|---|---|---|
| A-E | 57%-40%-62% | 40% |
| B-F | 75%-60%-63% | 60% |
| A-C | 43% | 43% |
| B-C | 25% | 25% |
| D-E | 38% | 38% |
| D-F | 37% | 37% |

Figure 5:
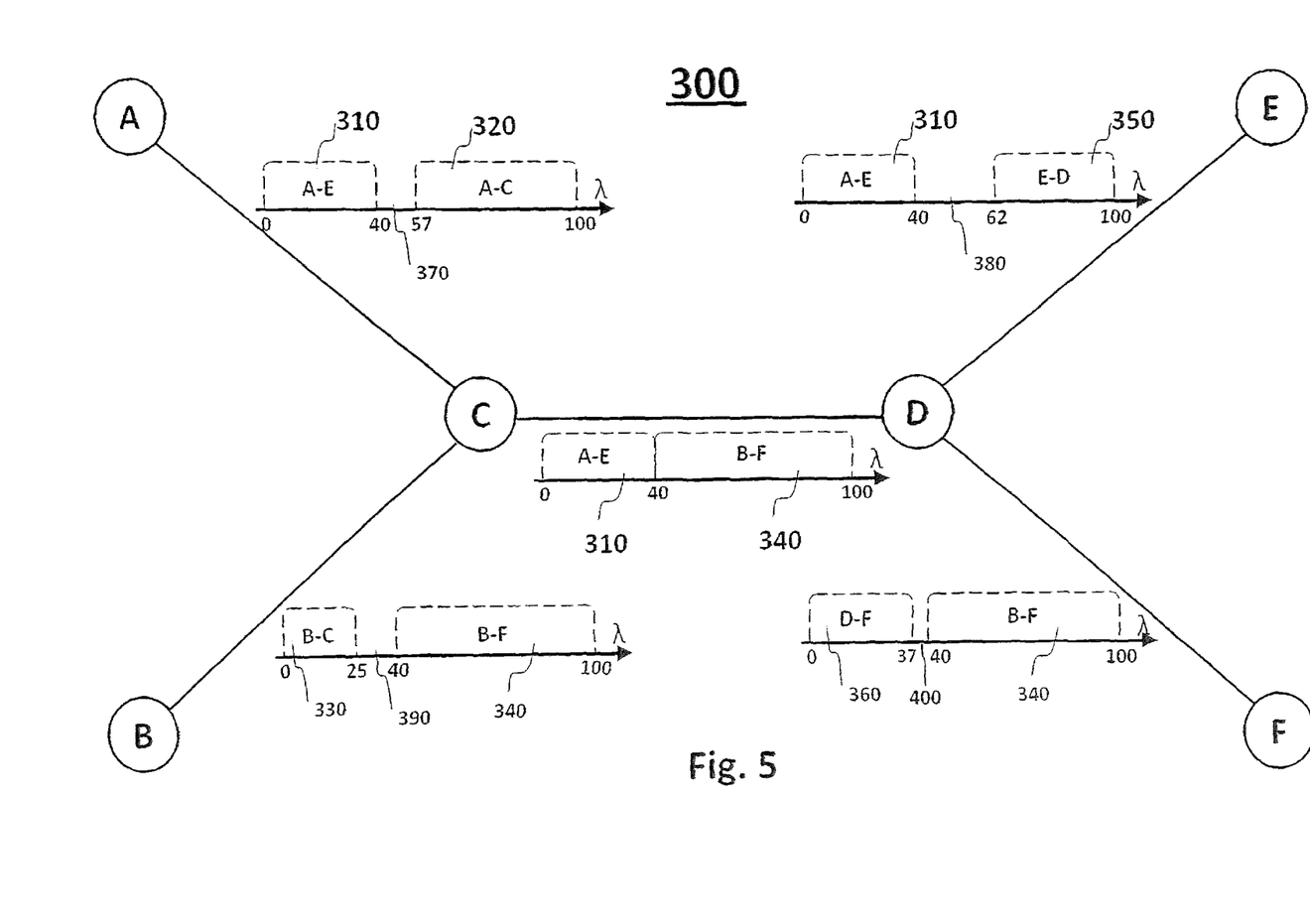
FIG. 5 is a schematic illustration of a first example of an assignment of spectrum blocks to node pairs of the network topology shown in FIG. 4.

A tentative example of such an assignment is given in FIG. 5. Note that for the sake of simplicity, the spectrum shares (A-E) 310, (A-C) 320, (B-C) 330, (B-F) 340, (E-D) 350, (D-F) 360 are directly mapped from the values given in Table III, leading to unassigned spectrum blocks 370, 380, 390, 400 between the bands assigned to each node-pair. In an example, these bands can also be subject to a soft reservation mechanism (i.e., in link A-C, demand A-C is the only one that can reserve the spectrum positions (40-57) 370, since demand A-E is spectrally limited by link C-D).

Figure 6:
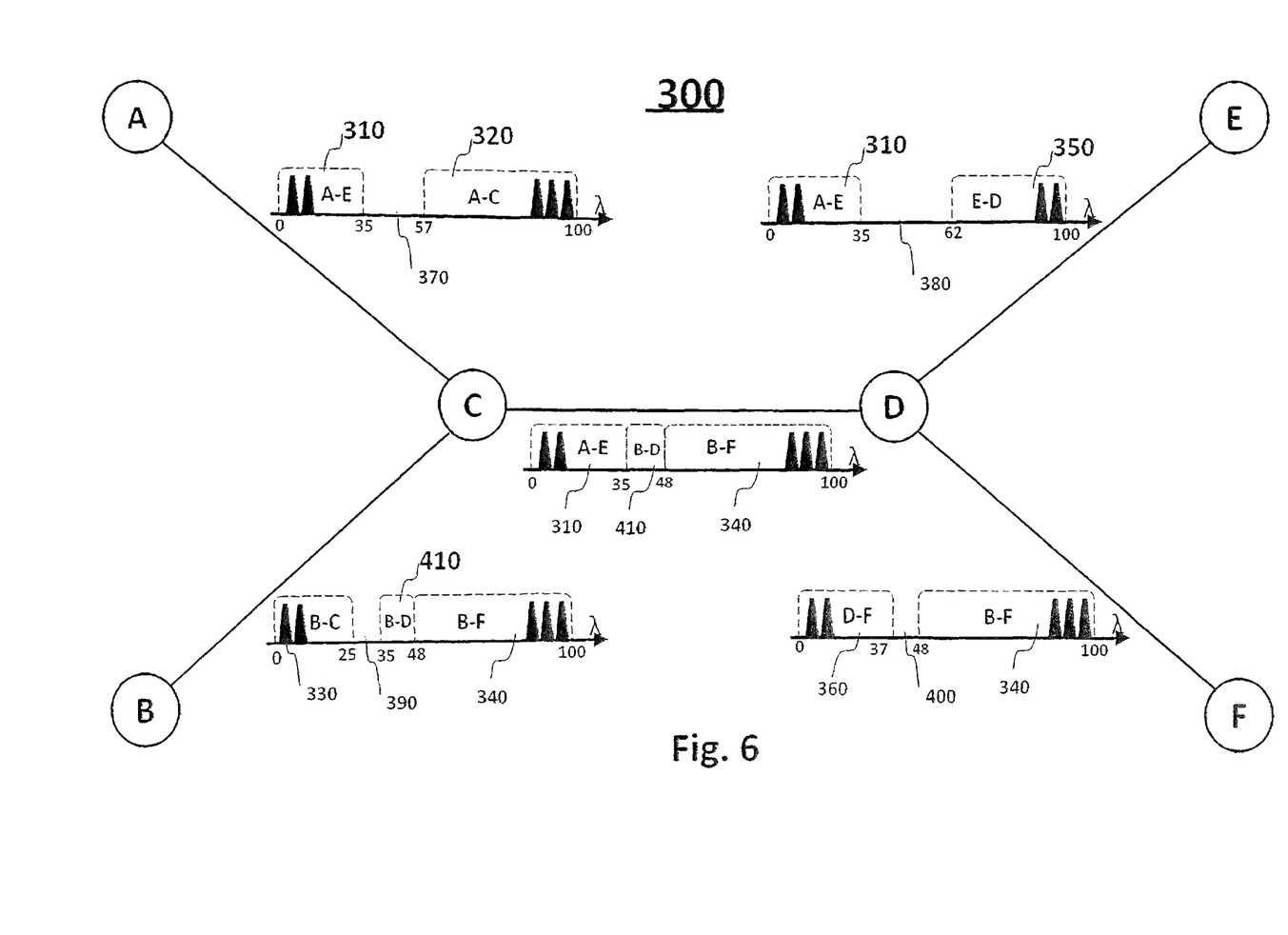
FIG. 6 is a schematic illustration of a second example of an assignment of spectrum blocks to node pairs of the network topology shown in FIG. 4.

Let us now suppose that the same network 300 from FIG. 5 is running in the operation phase, and that new forecast information 270 indicates that a new node-pair B-D may require traffic to be provisioned. The network management system 280 can update the traffic history/forecast database 230 and trigger 290 a re-adjustment of the spectrum allocation and MCh format selection. Assuming the new node-pair B-D has a relative weight of 4.0, this would require an adjustment of the share assignments for links B-C and C-D such as to accommodate the new spectrum share (B-D) 410. Consequently, as shown in FIG. 6, the band reservations for node-pairs (A-E) 310 and (B-F) 340 would have to be readjusted accordingly. Hence, this MCh readjustment requires a hard constraint preventing it from reassigning spectrum portions already occupied by existing carriers.

It follows that the proposed method according to the present invention is advantageous over traditional approaches when solving the problem of assigning resources in an optical transport network. For example, in contrast to conventional solutions, the method according to the present invention allows:

Fully exploiting the benefit of compacting as many carriers as possible onto the same MCh containers, thereby increasing overall spectral efficiency and extending network capacity.

Incorporating network statistics and traffic estimates to maintain the assignment of spectral resources as aligned as possible with actual and forecasted traffic requirements.

Simplifying network operation by pre-processing the type of MCh to be used in each path (which also facilitates the optical grooming of carriers onto the MCh containers).

Automatically accounting for the network topology when assigning spectrum, such that critical links can be avoided whenever possible by exploring the available path diversity for each node-pair.

The proposed method according to the present invention can also prove particularly useful in cases where:

There is an accurate ability to predict a localized shift in traffic patterns (e.g., a particular event requires an increase in connectivity for a known period of time between known end-nodes).

The network's traffic pattern features mostly connections with very large bandwidth requirements between specific end-nodes, such that very wide MChs can be deployed to explore the spectral dividend of optimizing guard-bands over deploying multiple smaller MChs.

Figure 7:
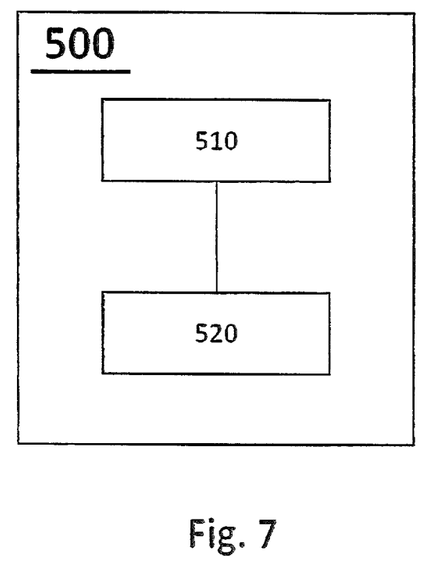
FIG. 7 is a block diagram showing a system including a processor and a memory coupled to the processor such as to perform a method according to the present invention.

FIG. 7 shows a system 50o including a processor 510 and a memory 520, wherein the memory 520 is coupled to the processor 510 and stores instructions adapted to have the processor 510 perform any of the above described method 200 according to the present invention.

The embodiments described above and the accompanying figures merely serve to illustrate the method and devices according to the present invention, and should not be taken to indicate any limitation thereof. The scope of the patent is solely determined by the following claims.

LIST OF REFERENCE SIGNS

100, Media Channel (MCh)
110, optical carriers
120, carrier spectral spacing
130, guard-band
200, method for assigning resources in an optical transport network
210, determine a plurality of candidate paths
220, determine the type of Media Channel Format to be used by candidate paths
230, traffic history and prediction database
240, determine expected weight of candidate paths
250, assign a spectrum share to each link of each candidate path
260, assign a band spectrum to the Media Channel Format to be used by each candidate path
270, externally provided updated forecasts
280, network controller/network management system
290, trigger of a planning workflow
300, optical transport network
310, 320, 330, spectrum shares of MChs passing through each link
340, 350, 360,
370, 380, unassigned spectrum blocks
390, 400,
410, a new spectrum share of an MCh
500, system
510, processor
520, memory.

The invention claimed is:

1. A method for assigning resources in an optical transport network, comprising the steps of:

determining a plurality of candidate paths each connecting a pair of nodes in an optical transport network, wherein each candidate path includes at least one optical link between nodes of the optical transport network;

determining a type of Media Channel Format to be used for each of the candidate paths;

determining an expected weight of each of the candidate paths, wherein the weights allow a relative estimate and comparison of traffic volume via the candidate paths;

assigning a spectrum share to each link of each of the candidate paths based on the determined Media Channel Formats to be used for the candidate paths and based on a comparison of the determined expected weights of the candidate paths contending for spectral capacity on the respective optical link; and assigning a band spectrum to the Media Channel Format to be used by each of the candidate paths corresponding to the spectrum shares assigned to the optical links of the candidate paths, wherein the band spectrum assigned to a Media Channel Format of a candidate path applies to each of the at least one optical link coupling the pair of nodes connected by the candidate path.

2. The method according to claim 1, wherein the determined candidate paths include all available candidate paths connecting pair of nodes in the optical transport network.

3. The method according to claim 1, wherein determining the type of Media Channel Format to be used for each of the candidate paths includes determining a modulation format of carriers, intra-carrier spacing between carriers, and/or a guard-band used in the respective Media Channel Format.

4. The method according to claim 1, wherein determining the type of Media Channel Format to be used for each of the candidate paths includes comparing a spectral-efficiency of different Media Channel Format types.

5. The method according to claim 1, wherein determining the expected weight of each of the candidate paths includes predicting the traffic volume via the candidate paths.

6. The method according to claim 5, wherein the spectrum share assigned to each optical link of each of the candidate paths is proportional to their predicted relative weight when compared to all weights carried by the respective optical link.

7. The method according to claim 1, wherein assigning a band spectrum to the Media Channel Format to be used by each optical link of a candidate path provides for a spectrum continuity of the Media Channel Format used by the candidate path.

8. The method according to claim 7, wherein the band spectrum assigned to all optical links of a candidate path corresponds to the minimum spectrum share of the optical links of the candidate path.

9. The method according to claim 1, wherein assigning a band spectrum to the Media Channel Format to be used by each optical link of a candidate path is based on assigning a single Media Channel Format allocated to a single spectral window to each candidate path, wherein different Media Channel Formats or different spectral windows may be assigned to different candidate paths.

10. The method according to claim 9, wherein the single spectral window of a candidate path occupies at least 10% of the total traffic volume carried by each optical link of the candidate path.

11. The method according to claim 1, wherein the method is repeated when a node is added to or removed from the optical transport network.

12. The method according to claim 1, further comprising monitoring live traffic information or receiving forecasts describing expected changes in demands such as to update a predicted traffic volume via the candidate paths of the optical transport network, wherein the updated predicted traffic volume is used for determining the expected weight of each of the candidate paths.

13. The method according to claim 12, wherein the steps of: determining the type of Media Channel Format to be used for each of the candidate paths; determining the expected weight of each of the candidate paths; assigning a spectrum share to each link of each of the candidate paths; and assigning a band spectrum to the Media Channel Formats to be used by each of the candidate paths, are repeated when the predicted traffic volume is updated.

14. The method according to claim 12, wherein receiving forecasts describing expected changes in demands includes receiving information indicating that a change in traffic demand or technical installation in one of the nodes of the optical transport network is expected to affect the traffic volume in the optical transport network.

15. A system including a processor and a memory, wherein the memory is coupled to the processor and stores instructions adapted to have the processor perform the method according to claim 1.

\* \* \* \* \*